United States Patent Office 3,342,548
Patented Sept. 19, 1967

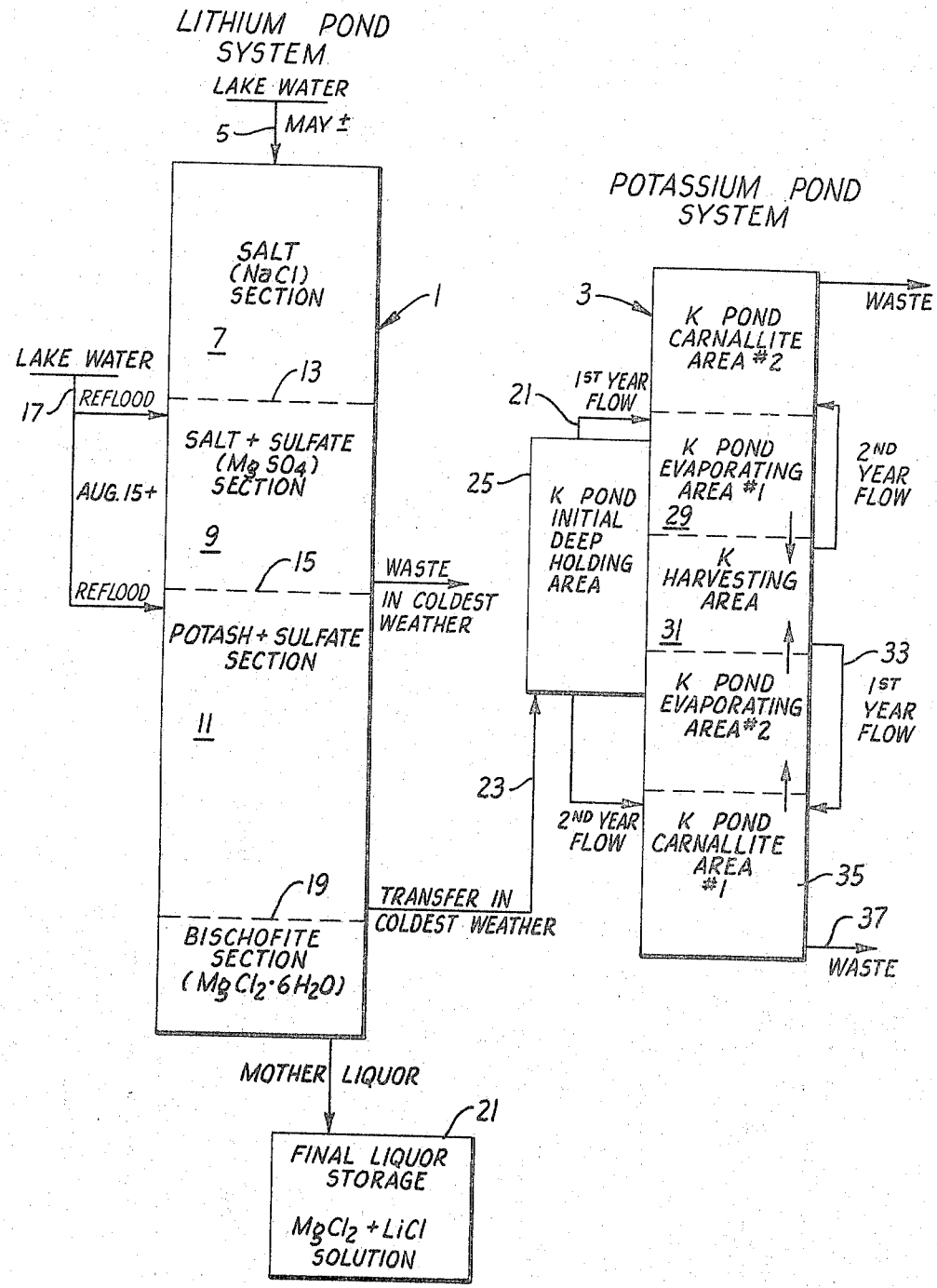

3,342,548
PROCESS FOR THE RECOVERY OF LITHIUM AND POTASSIUM FROM GREAT SALT LAKE BRINE
James G. Macey, Salt Lake City, Utah, assignor to Signal Oil and Gas Company, Los Angeles, Calif., a corporation of Delaware
Filed Sept. 16, 1963, Ser. No. 309,162
3 Claims. (Cl. 23—89)

This invention relates to a method for lithium and potassium recovery from the brine of Great Salt Lake and more specifically relates to a method of pond management. The brine of Great Salt Lake contains about 2.8% magnesium chloride, about 0.027% lithium chloride, about 2.8% sodium sulfate, about 0.9% potassium chloride, and from 19% to 20% of sodium chloride. Although both the lithium and potassium values are substantial in the Lake, heretofore it has been impractical to obtain them in a commercially useful manner because of the presence of the undesired salts, such as the sulfate, which bring the desired potash salt down in such form that mechanical harvesting is impractical. The lithium is prevented from reaching a high concentration by the magnesium chloride. Evaporative concentration ceases when the magnesium chloride concentration reaches 36–38%.

In accordance with the present invention, a pond system and pond management scheme is provided wherein a high lithium concentration is easily obtained in solar evaporated Great Salt Lake water. Furthermore, the present invention provides a method for crystallizing potassium chloride or a mixed salt of potassium chloride and sodium chloride containing in excess of 50% potassium chloride. There is a minimum contamination of the harvested crop by crystal water, magnesium compounds, or other sodium compounds. Since it is ordinarily not economically feasible to pick up potash salts from a harvesting area and further purify them by flotation or crystallization if they have much less than about 50% potassium chloride, it is readily apparent that the process of the present invention offers great economic advantages.

Furthermore, the process of the present invention greatly increases the ratio of lithium to magnesium in a final stage of the evaporation process by the conservation and use of sulfates dropped at an earlier part of the process so that a solution high in lithium is obtained which can be economically dealt with by calcining.

Thus, it is a primary object of the present invention to produce a high strength lithium chloride solution from the Great Salt Lake waters by means of solar evaporation and at a low cost.

Another object of the present invention is the derivation of waters at one stage of the pond management which are relatively high in potash, relatively low in magnesium, sodium and lithium content, and exceptionally low in sulfate content. As a result of this, it is relatively easy to induce potash crystallization in the form of sylvinite, a mixed salt of NaCl and KCl, the mixture being in a mol ratio or close to it. This makes for low cost production of potash salts and lithium chloride.

The sole figure of the drawing is a flow diagram showing a preferred embodiment of the present invention and the invention will be explained by reference to the drawing.

An important feature of the method is to concentrate by solar evaporation, allowing the sulfate ions in the water to build up for at least a single year by being precipitated out and thereafter redissolved during a reflooding operation to combine with the unwanted magnesium ions to form a relatively insoluble magnesium sulfate in the hot summer months. One seeks a maximum reduction of magnesium ion in the remaining solution in order that concentration may go on to the point of achieving a high lithium chloride content.

One can save almost all the sulfate which deposited on the pond bottoms during the first year, keeping it in the pond systems and altering it from its first deposition form of magnesium sulfate, specifically epsomite, $MgSO_4 \cdot 7H_2O$, to a winter dropped-out sodium sulfate ($NaSO_2SO_4 \cdot 10H_2O$) from, thus preserving it for use in dropping out the next year's magnesium content of the Lake water to a much increased extent, as compared with the results during the initial evaporative year. At the same time, winter solutions relatively low in sulfate and relatively high in potash are transferred to a potash concentrating and crystallizing area.

Referring now to the drawing, a lithium pond 1 and a potassium pond 3 are provided for carrying out the invention. Both of these ponds are relatively long, narrow ponds and have barriers therein which can be removed or opened to control the flow, as is hereinafter described in detail. To operate in accordance with the scheme of the present invention, Lake water is pumped steadily into one end of the lithium pond 1 at the point designated 5 in the spring, such as around the middle of May. The rate of pumping is such that evaporation removes most of the liquid so that a relatively small amount of the liquid reaches the opposite end of pond 1. Naturally, this flow rate will be proportional to the evaporative effect and will vary in accordance with how hot and windy the weather is while the evaporation is taking place. As evaporation takes place, sodium chloride will first precipitate in that section of the pond designated 7, and as the liquid flows to the section designated 9, magnesium sulfate plus sodium chloride will be precipitated.

In area 11, a variety of potash salts will drop out, e.g. sylvinite, various double salt combinations, and finally carnallite as one approaches the end of area 11 at line 19 of the drawing. There will be a small amount of NaCl, diminishing as one approaches line 19, and a substantial amount of $MgSO_4 \cdot 7H_2O$.

The mother liquor spilling into the bischofite area is composed chiefly of $MgCl_2$ and LiCl. There is some drop out of bischofite crystals ($MgCl_2 \cdot 6H_2O$) and a further concentration of LiCl. The mother liquor reaching the end of the lithium pond system is, after the second year, at least 10% LiCl and is ready for transfer as it forms to the final liquor storage pond 21, a pond so deep that the normal winter rainfall will not result in excessive dilution.

By ascertaining that the specific gravity of the solution is within the range 1.36 to 1.38, the operator will be informed that the waters at the end of pond system No. 1 have reached a point where they may be harvested; a specific gravity within this range indicates the appropriate concentration of lithium chloride.

The foregoing all takes place at pond temperatures of 85° F. and more, assuring that almost all sulfate ions will drop out as $MgSO_4 \cdot 7H_2O$ and a minimum as Astrakanite ($MgSO_4 \cdot Na_2SO_4 \cdot 4H_2O$).

After the end of the summer evaporative season, when pond 1 is empty of final liquor (about September 1), fresh Lake water is brought into section 9 and the sulfate which precipitated in section 9 is largely redissolved. During the coldest weather of winter, the sulfate reprecipitates as mirabilite ($Na_2SO_4 \cdot 10H_2O$) and the then remaining solution is pumped off to waste. Section 11 is also reflooded with fresh Lake water in an amount sufficient to dissolve the potash and magnesium sulfates. During the ensuing winter, when the sulfate has reprecipitated as mirabilite, the remaining high potash liquor is pumped to the potassium pond system. Thus, 85–90% of the $SO_4$ is precipitated as $Na_2SO_4 \cdot 10H_2O$ in pond 11 and magnesium and potassium are pumped to the potassium pond system as $MgCl_2$ and KCl.

In order to develop a high level lithium chloride content, it is essential that the ratio of magnesium chloride to lithium chloride be dropped from the starting 103:1 down to as low as 3:1. In order to accomplish this, it is necessary to have enough sulfate in the pond 11 to drop out the bulk of the magnesium ion as the epsomite crystal, $MgSO_4 \cdot 7H_2O$. This material is much less soluble than magnesium chloride or lithium chloride.

Further, it should be noted that if one tries to concentrate a solution containing the chlorides of magnesium and lithium, the starting ratio being 103:1, such concentration will proceed in the climate in the area of the Great Salt Lake only until the magnesium chloride reaches 38%. If the magnesium chloride started at 2.8%, as is the case with Lake water, then the concentration ratio would be 38:2.8 or 14-fold. This 14-fold concentration would raise the lithium chloride level from .027% to .38%, leaving it far from the desired 10% goal.

However, Lake water contains 1.9% of sulfate ion and .9% of potassium chloride. Both tend to cause some of the magnesium to precipitate. By completing this portion of the process during the hot months when the solutions remain warm, it is possible to obtain 3% to 5% LiCl in a 30% to 35% $MgCl_2$ solution. By doubling this sulfate quantity through maintaining the first year's sulfate in the lithium pond system, it is possible to raise the LiCl level to 10% in a second year and somewhat higher in later years.

However, it is not necessary to raise the LiCl figure above 10%, for when one calcines the 30% $MgCl_2$-10% LiCl material, one obtains a readily saleable pure magnesium oxide, which itself pays for that portion of the processing cost.

As noted earlier, the resultant solution at the end of section 11 is held until arrival of the coldest weather when the liquor is transferred by line 23 to the potassium pond deep holding area 25. The sulfate remains in section 11 in the form of mirabilite.

Liquor pumped from the potassium section of the lithium pond 11 to the potassium pond system first goes into a deep holding area where it may be retained and eventually pumped out into the potassium pond system as the evaporative weather becomes warmer and more effective.

When the weather begins to warm up, liquor from the deep holding pond 25 is passed through line 27 into that section of the potassium pond 3 designated 29. The liquid then flows downward and is evaporated at such a rate that the bulk of the potassium values are precipitated as sylvinite in the pond 31, from which they can be harvested. The supernatant liquid is flowed through the line 33 to the pond 35, where carnallite precipitates out and the supernatant liquid flows to waste through line 37.

The specific gravity of the material in the carnallite section will be held within the specific gravity range of 1.33 to 1.34 so that the final liquor washed back into the Lake will contain magnesium chloride but will be very low in potash.

Each year the flow is reversed, as is shown by the arrows on the drawing, so that each time the carnallite is back-flushed to the head of the potassium pond system.

EXAMPLE

On May 15th, the flow of Lake water into a pond corresponding to section 7 in the drawing was begun. It took from two weeks to four weeks for this flow-through to arrive at the end of the bischofite section as a liquor. The strength of the mother liquor arriving at the bischofite section was checked when the first material arrived and was deliberately controlled in flow speed so that there was obtained an approximate 5% LiCl, 35% $MgCl_2$ and 60% $H_2O$ solution. Following June 30, high LiCl mother liquor was removed from the lower end of the bischofite pond and advanced to the permanent winter deep storage corresponding to the storage designated 21 in the drawing. Through August 15, the Lake water was pumped into the system through the line corresponding to that emptying at point 5 in the drawing. Between the 15th and 30th of August, the pond system was drained toward the mother liquor end and the introduction of additional Lake water was discontinued. Sections of the pond system corresponding to 9 and 11 in the drawing were then flooded with Lake water to dissolve virtually all of the potash and magnesium sulfate salts in the period of the next two weeks. Dilution with Lake water continued so that no magnesium sulfate or potash salts recrystallized out due to high evaporative rates. In November and December, the sulfate began to crystallize out in the form of mirabilite. The potassium and magnesium ions remained in solution. Something in excess of 85% of the sulfate thus crystallized out during the coldest portion of a severe cold spell. During a subsequent cold spell around the first of the next year, the remaining liquor from area 9 was transferred to waste, leaving mirabilite on the pond bottom. The liquor remaining in area 11 was advanced to the potassium pond initial deep holding area, at the same time also leaving mirabilite on the bottom of pond 11.

During the next year, beginning at the first of May, Lake water was flowed into pond 9 and thence lead to pond 11 and finally to the bottom end of the bischofite pond area. While pond 9 was draining and as soon as the waters reached the end of the bischofite pond, the waters at the end of the bischofite pond at a point corresponding to the line designated 19 were recycled to the head of pond 7. As the quantity of the water was small relative to the capacity of pond 7, additional Lake water was added. As pond 7 became flooded and pond 9 fully drained, normal flow from pond 7 to pond 9 was initiated. When the bischofite section was drained, normal flow to the end of the bischofite section from pond 11 was again undertaken. At this time, the liquors which reached the end of the bischofite pond were in the form of finished mother liquor having a composition of approximately 10% LiCl, 30% to 33% $MgCl_2$ and the balance $H_2O$. Water was pumped from the Lake into pond 7 until about August 15, following which time the pond system was drained as during the first year.

During the coldest part of the preceding winter, the liquor from pond 11 of the lithium pond system had been transferred to the potassium pond deep holding area and on April 1 of the second year, the flow of liquor from the deep holding area through the potassium pond system designated 3 in the drawing was begun. The incoming liquor passed through the potassium pond carnallite area No. 2, thereafter to the potassium pond evaporating area No. 1 and thence to the potassium harvesting area. Finally, it was passed to the potassium pond carnallite area 1. The final liquor remaining in the potassium pond system designated carnallite pond No. 1 was a strong magnesium chloride bittern having little else associated with it. This was passed to waste back to the Lake.

In the third year, the deep holding pond area again was filled with liquor from section 11 of the lithium pond system and on April 1 of the third year the flow of liquor was permitted from the potassium deep holding area into the potassium pond carnallite area No. 1, thence to the potassium pond evaporating area No. 2, then to the potassium harvesting area, and finally to the potassium pond carnallite area No. 2. The strong magnesium chloride bittern remained in liquid phase and was returned to the Lake. The direction of flow through the potassium pond system was alternated from year to year. By repeating the process described above, the sulfate level was raised to approximately 1.85 times that of the untreated material. The sulfate yearly build-up is at the rate of about .85 times the first year's amount. Excessive quantities are found after 3–4 years.

I claim:
1. A process for the isolation of lithium and potassium values from Great Salt Lake brine, said process comprising:
 (a) Providing a lithium pond system consisting of a series of connected ponds for the recovery of lithium value;
 (b) Providing a potassium pond system consisting of a series of connected ponds for the recovery of potassium values from effluent from said lithium pond system;
 (c) Flowing brine from said lake into one end of said lithium pond system at ambient temperature of at least about 85° F.;
 (d) Regulating the rate of flow of said brine through said lithium pond system while maintaining said temperature at at least about 85° F., said temperature being sufficient to progressively evaporate said brine so that there is successively precipitated from the brine in individual ponds of said lithium pond system (1) sodium chloride (NaCl); (2) magnesium sulfate (MgSO₄) together with sodium chloride; (3) magnesium sulfate together with sylvinite (a mixture of sodium chloride and potassium chloride); and (4) bischofite (MgCl₂·6H₂O), whereby the resulting liquor in the pond (4) containing the precipitated bischofite is rich in dissolved lithium chloride (LiCl) and magnesium chloride (MgCl₂);
 (e) Removing said liquor from pond (4) containing said precipitated bischofite and recovering lithium values from said liquor by calcining said liquor;
 (f) Reflooding pond (2), containing the precipitated magnesium sulfate together with sodium chloride, with fresh lake water and dissolving said magnesium sulfate in said lake water while maintaining said temperature at at least about 85° F., maintaining said magnesium sulfate in solution until it reacts with the sodium chloride in said solution to form sodium sulfate (Na₂SO₄) and thereafter lowering the temperature of said solution to precipitate the major portion of said sodium sulfate as mirabilite

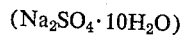
(Na₂SO₄·10H₂O)

in said pond (2), and thereafter discarding the supernatant liquid from pond (2);
 (g) Reflooding pond (3) of said lithium pond system, said pond containing precipitated magnesium sulfate together with sylvinite, with lake water at a temperature sufficient to redissolve said magnesium sulfate and sylvinite and permitting said magnesium sulfate to remain in solution until it reacts with sodium chloride also in solution to form sodium sulfate, thereafter decreasing the temperature of said solution to precipitate the major portion of said sodium sulfate from said solution as mirabilite, and transferring the resultant supernatant liquid to the initial pond of said potassium pond system while maintaining said sodium sulfate in said pond (3) in precipitated mirabilite form;
 (h) Passing said resultant supernatant liquid now containing sylvinite but relatively free of sulfate from the initial pond of said potassium pond system into an evaporating pond of said potassium pond system and evaporating said liquid therein until a major proportion of the potassium chloride present in said liquid is precipitated therefrom as sylvinite; and,
 (i) Flowing the supernatant from said evaporating pond of said potassium system and thereafter harvesting the precipitated sylvinite from said evaporating pond; and
 (j) Repeating the steps of paragraphs (c) through (i) in sequence.

2. The process of claim 1 wherein said liquid remaining after precipitation of potassium chloride as sylvinite therefrom in said potassium pond evaporating pond is passed to a separate pond in said potassium pond system, wherein evaporation is continued to effect the precipitation of a major proportion of the carnallite

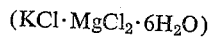
(KCl·MgCl₂·6H₂O)

therein.

3. The process of claim 2 wherein the pond in which the said carnallite is precipitated is periodically reflooded by liquid from the initial potassium pond system pond to redissolve precipitated carnallite before passing said liquid into the first-mentioned evaporating pond in said potassium pond system.

References Cited

UNITED STATES PATENTS

| 2,687,339 | 8/1954 | Dancy et al. | 23—91 X |
| 3,058,806 | 10/1962 | Ebner | 23—128 X |
| 3,099,528 | 6/1963 | Hadzeriga | 23—89 |
| 3,101,247 | 8/1963 | Serowy | 23—89 X |

OTHER REFERENCES

Hackh's Chemical Dictionary, third edition, revised, 1944, pages 129, 171, 825, McGraw-Hill Book Company, Inc., New York. N.Y.

OSCAR R. VERTIZ, *Primary Examiner.*

E. STERN, *Assistant Examiner.*